(12) United States Patent
Ma et al.

(10) Patent No.: US 7,988,344 B2
(45) Date of Patent: Aug. 2, 2011

(54) CYCLING COMPUTER WITH DETACHABLE LIGHTING APPARATUS FOR BICYCLE OR OTHER VEHICLE

(75) Inventors: Cheuk Nam Ma, Hong Kong (CN); Kwok Ming Au, Hong Kong (CN); Ka Yiu Sham, Great Falls, VA (US)

(73) Assignee: Acumen, Inc., Sterling, VA (US)

( * ) Notice: Subject to any disclaimer, the term of this patent is extended or adjusted under 35 U.S.C. 154(b) by 97 days.

(21) Appl. No.: 12/412,882

(22) Filed: Mar. 27, 2009

(65) Prior Publication Data

US 2010/0246199 A1    Sep. 30, 2010

(51) Int. Cl.
*B62J 6/00* (2006.01)

(52) U.S. Cl. .......................... 362/474; 362/473; 362/475

(58) Field of Classification Search .......... 362/473–476, 362/197, 199
See application file for complete search history.

(56) References Cited

U.S. PATENT DOCUMENTS

| | | | |
|---|---|---|---|
| 6,000,811 A * | 12/1999 | Bordak | 362/158 |
| 6,428,192 B1 * | 8/2002 | Chen | 362/474 |
| 6,736,529 B1 * | 5/2004 | Lee | 362/287 |
| 7,192,169 B2 | 3/2007 | Takeda | |
| 7,780,321 B1 * | 8/2010 | Retief | 362/474 |
| 2005/0180150 A1 * | 8/2005 | Okada et al. | 362/473 |
| 2005/0237734 A1 * | 10/2005 | Krieger | 362/157 |
| 2006/0002119 A1 * | 1/2006 | Sharp | 362/473 |
| 2006/0007693 A1 | 1/2006 | Grepper | |
| 2007/0076410 A1 * | 4/2007 | Halasz | 362/197 |
| 2007/0171629 A1 * | 7/2007 | Langenwalter | 362/108 |

* cited by examiner

*Primary Examiner* — Evan Dzierzynski
(74) *Attorney, Agent, or Firm* — Crowell & Moring LLP

(57) ABSTRACT

A lighting apparatus useable with a bicycle or other manually operated vehicle includes first and second housings, as well as a connection mechanism by which the first and second housings are attachable to and detachable from each other. A central processing unit and at least one power source are receivable within the first housing, while the second housing includes a light emitting element that is adjustable to multiple angular positions relative to the first housing to provide illumination at different emission angles. The second housing constitutes one of a plurality of second housings that are interchangeable to provide for varied lighting conditions. The connection mechanism allows relative pivotal movement between the first and second housings and permits electrical communication between the light emitting element and the power source when the first and second housings are attached to each other.

20 Claims, 8 Drawing Sheets

Press & hold and then rotate

CYCLING COMPUTER WITH DETACHABLE LIGHTING APPARATUS FOR BICYCLE OR OTHER VEHICLE

CROSS-REFERENCE TO RELATED APPLICATION

Cross-reference is hereby made to commonly assigned, co-pending U.S. patent application Ser. No. 12/032,189, filed Feb. 15, 2008, published on Aug. 20, 2009, as U.S. Patent Application Publication 2009/0207624 A1, the disclosure of which is incorporated herein by reference in its entirety.

BACKGROUND OF THE INVENTION

1. Field of the Invention

Cycle computers and lighting devices are typically available as separate add-on components for bicycles, and are, normally, detachably mounted on bicycle handlebars. The cycle computer collects and exhibits bicycle data, such as speed, cadence, distance traveled, ride time, and altitude; navigation data; and physiological data, such as heart rate, power, and hydration index. The cycle computer can receive signals representative of the measured data via wired and/or wireless sensors, and display those data by way of a liquid crystal display or any other appropriate display type.

2. Description of Related Art

U.S. Pat. No. 7,192,169 relates to a bicycle lighting apparatus including a computer housing adapted to be mounted to a bicycle and a computer housed within that housing. The computer housing includes an angled portion. The lighting device is an integrated lighting device, which is controlled by the computer, and light from the lighting device is emitted from the angled portion of the computer housing.

Published U.S. Patent application 2006/0007693 A1 relates to a front light for a bicycle with an electrical illumination device arranged behind a light outlet port, a fastening device for fastening the light device to a bicycle, a minicomputer arranged in the light device, and a computer display on an exterior face of the light device.

SUMMARY OF THE INVENTION

According to the invention, a lighting apparatus useable with a bicycle or other manually operated vehicle includes first and second housings, as well as a connection mechanism by which the first and second housings are attachable to and detachable from each other. A central processing unit and at least one power source are receivable within the first housing, while the second housing includes a light emitting element that is adjustable to multiple angular positions relative to the first housing to provide illumination at different emission angles. The second housing constitutes one of a plurality of second housings that are interchangeable to provide for varied lighting conditions. The connection mechanism allows relative pivotal movement between the first and second housings and permits electrical communication between the light emitting element and the power source when the first and second housings are attached to each other.

The connection mechanism, in the configuration described, is a pivot mechanism including an actuator operable to either release the first and second housings from each other or secure the first and second housings together. The actuator is also operable to lock the second housing in any of multiple pivotal positions relative to the first housing.

The second housing is one of a plurality of second housings that are interchangeable to provide for varied lighting conditions. In a preferred configuration, a pair of direct current power sources is receivable within said first housing. In the arrangement described and shown, each of the first and second housings includes multiple contacts by which said electrical communication is provided.

By way of the present arrangement, light emitting elements can be controlled separately from and powered independently of the cycle computer. The cycle computer is housed within a computer housing, with the lighting device disposed in another housing that is detachable from the computer housing. The cycle computer housing has an LCD display, and information provided on the display is controlled by the cycle computer.

The invention readily permits a light housing having a translucent window element to be detached and replaced with another housing, such as a housing including a colored translucent window element, a convergent translucent window element, a colored and convergent translucent window element, a divergent translucent window element, or a colored and divergent translucent window element. By providing for such substitutions, the present invention permits a bicycle rider or other vehicle operator to easily intensify and maximize the visibility of the riding surface in front of a bicycle.

The angle of the light housing is rotationally adjustable along an axis roughly perpendicular to the light path of the lighting device, and the lighting device housed within the light housing has a rotational mechanism permitting changes to the emission angle of the light. If desired, therefore, the light emitted by the lighting device may be directed forwardly but not downwardly to facilitate viewing road conditions far ahead of a rider or downwardly to facilitate viewing close-by riding surface conditions.

The cycle computer and the lighting device may have independent dc power sources. The dc power source of the cycle computer and the dc power source of the lighting device can be housed in either a single compartment or more than one compartment.

The light emitting elements utilized may be of any desired type, including halogen bulbs, light emitting diodes, super-brightness light emitting diodes (super LEDs), and/or solid state emitters. As the light housing is detachable, it can also be replaced with removable components of other types, such as a reflector or a cover.

Although one particular connection mechanism is described and illustrated, the light housing can be made attachable and detachable using any appropriate connection mechanism, such as a snap-on and/or snap-in mechanism, a sliding mechanism, a screw-in mechanism, a spring-loaded mechanism, or a clip-in or force-in mechanism.

In principle, the lighting apparatus could be adapted for mounting anywhere on a bicycle or other such vehicle. Of course, having the apparatus mounted in front of a bicycle handlebar stem provides forward and center line illumination facilitating a rider's view of the road ahead. The apparatus further provides a central cycle computer display to facilitate reading the information.

Additional inventive features will be described in the detailed descriptions of the figures presented below, and any single feature or combination of features together mentioned above or below are the development of further inventions as given in the claims and their equivalents.

BRIEF DESCRIPTION OF THE DRAWING FIGURES

DETAILED DESCRIPTION OF THE INVENTION

While the detailed description below discusses the use of the invention in conjunction with a bicycle, it is to be understood that the invention is appropriate for use with other user-operated vehicles, such as tricycles or four-wheeled, pedal or otherwise manually-operated vehicles, as well as with vehicles such as intermittently powered or power-assisted bicycles.

Figure 1:
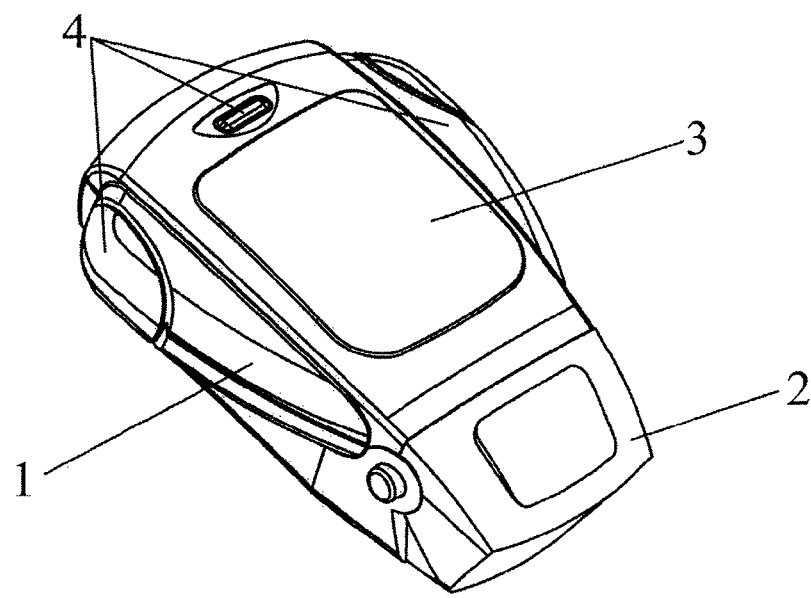
FIG. 1 is a perspective view from above a particular embodiment of a bicycle lighting apparatus according to the present invention that comprises a cycle computer and a lighting device.
Figure 7:
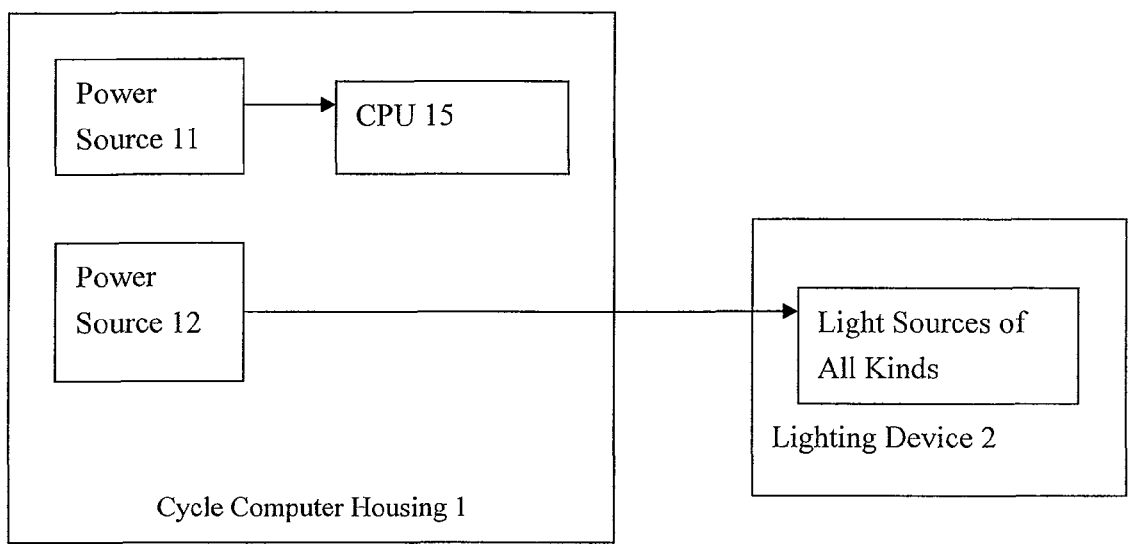
FIG. 7 is a block diagram representing the overall cooperation of dc power sources with the CPU or cycle computer and with the lighting device.

FIG. 1 shows one embodiment of a bicycle lighting apparatus including a first housing 1 for a cycle computer and a second housing 2, which constitutes a lighting device. The cycle computer housing 1 is shown to enclose a cycle computer or central processing unit (CPU) 15, which is schematically represented in FIG. 7, a conventional liquid crystal display (LCD) 3, and switch elements 4 for controlling the operation of the CPU 15. The front of the cycle computer housing 1 has a mounting mechanism 8, generally indicated in FIG. 4, to which the lighting device 2 is mounted for lighting the road or some other area outside of the cycle computer housing 1.

The switch elements 4 are conventional, and can be configured as typical push-on/push-off or engage and release switches. A user may press or engage and press again or release selected switch elements 4 in appropriate sequences to choose one or more of the various types of information that, in a conventional manner, can be output by the cycle computer and visually displayed by the LCD 3. This information, for example, could relate to current speed, average speed, ride time, distance traveled, terrain characteristics, date, time of day, and so on.

Figure 2:
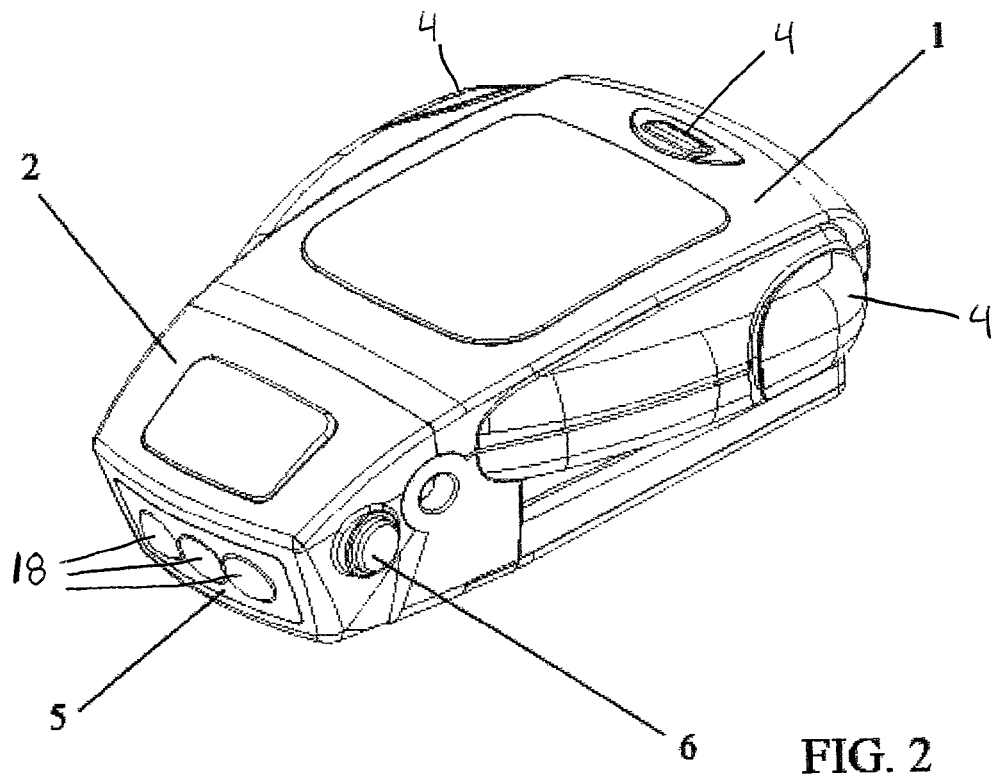
FIG. 2 is a perspective view similar to FIG. 1 but of the other side of the apparatus.

FIG. 2 is a side view of the bicycle lighting apparatus that is similar to the view of FIG. 1 but from the other side. The lighting device 2 preferably includes three light emitting diodes (LEDs) 18, to be described, disposed behind a translucent window element 5. The lighting device 2 also includes a switch element 6 for controlling the operation of the lighting device. The switch elements and other components of the bicycle lighting apparatus are discussed further below, although the switch element 6 itself is conventional and can be configured as typical push-on/push-off or engage and release switch similar to the switches 4.

Figure 3:
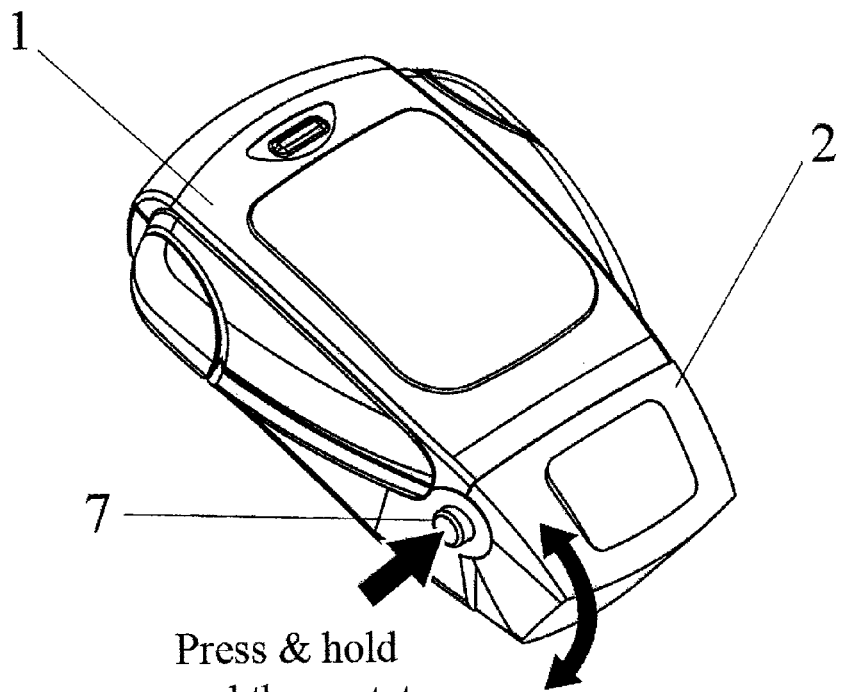
FIG. 3 is a view that is essentially the same as that of FIG. 1 but in which a pivot mechanism of the lighting device is indicated.

FIG. 3 is a view that is essentially the same as that of FIG. 1; in FIG. 3, however, a pivot mechanism 7 of the lighting device 2 is indicated. The pivot mechanism 7 is provided for permitting adjustment and controlling the emission angle of light emitted by the lighting device. If desired, the light emitted by the lighting device 2 may be directed forwardly but not downwardly to facilitate viewing road conditions far ahead of a cyclist. The light emitted by the lighting device 2, of course, also may be directed downwardly to facilitate viewing the road conditions immediately in front of the cyclist.

Figure 4:
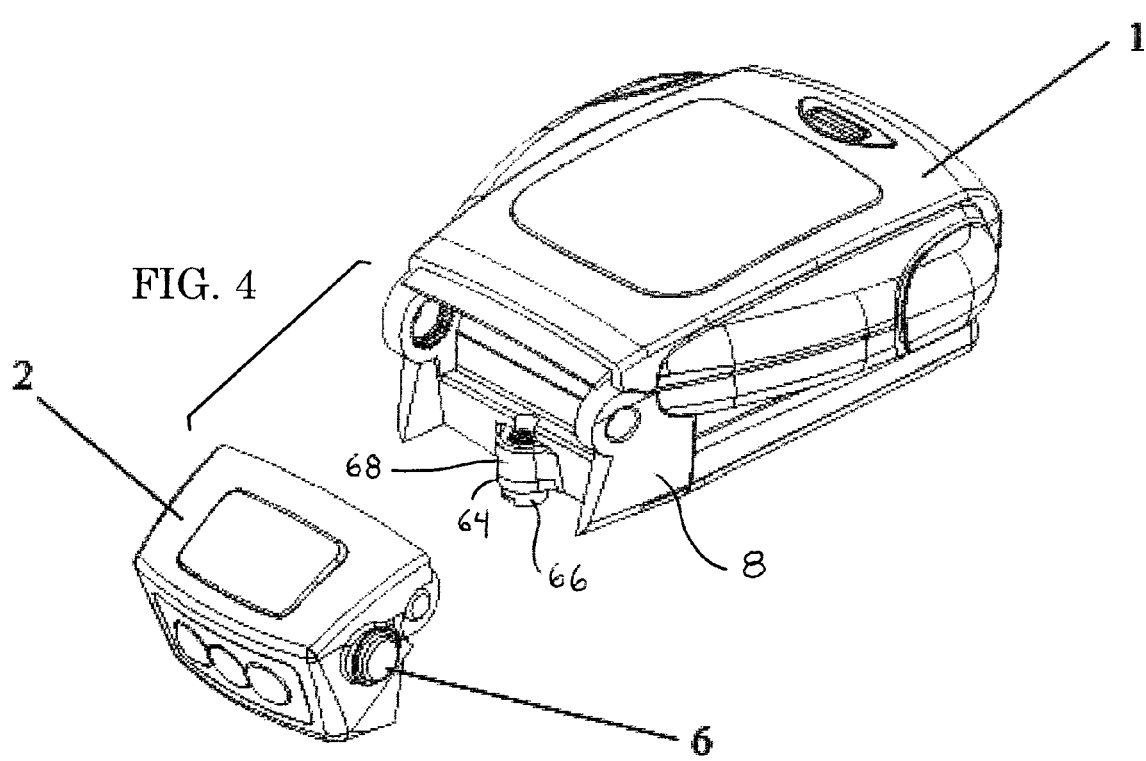
FIG. 4 is a view showing the lighting device as detached from the cycle computer housing.

FIG. 4 shows the lighting device 2 as detached from the cycle computer housing 1. The front of the cycle computer housing 1 has a mounting mechanism 8 in which the lighting device 2 is mountable. If desired, the lighting device 2 can be replaced by a lighting device with any of a colored, translucent window element, a lighting device with a colored, convergent, translucent window element, a lighting device with a colored, divergent, translucent window element, a reflector, or a cover.

Figure 5:
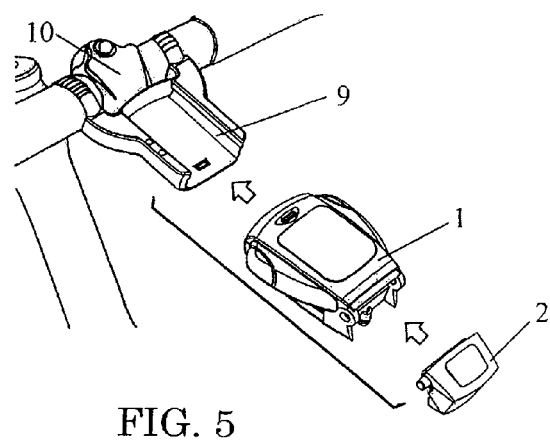
FIG. 5 shows a manner in which the cycle computer and the lighting device can be assembled.

FIG. 5 shows a manner in which the cycle computer housing 1 and the lighting device 2 can be assembled. A bicycle mount 9, which receives the cycle computer housing in a manner to be described, is designed to be mounted adjacent to a bicycle handlebar stem by which a bicycle handlebar 10 is connected to the remainder of the bicycle. The cycle computer housing 1 and the lighting device 2, of course, can further be adapted for mounting anywhere on a bicycle.

Figure 6:
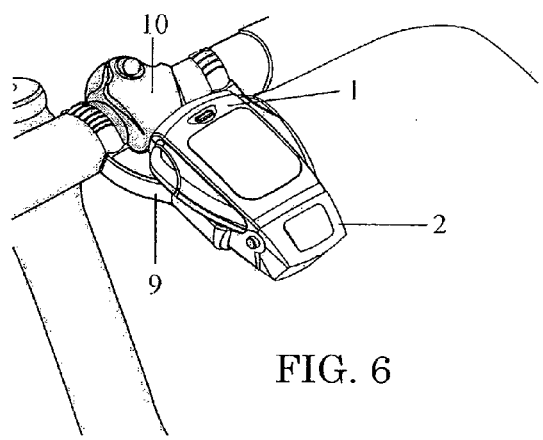
FIG. 6 is a view of the cycle computer housing, the lighting device, and the bicycle mount in a mounted condition adjacent to a bicycle handlebar stem.

FIG. 6 is a view of the cycle computer housing 1, the lighting device 2, and the bicycle mount 9 in a mounted condition adjacent to a bicycle handlebar stem. The configuration shown provides forward and center-line illumination of the lighting device 2 to facilitate viewing the road ahead of the cyclist. This configuration also provides a centrally located line display of the cycle computer housing 1 to facilitate reading of displayed information by a rider.

FIG. 7 is a block diagram representing the overall cooperation of a direct current (dc) power source, multiple dc power sources, or sources of different kinds with the CPU 15 and the lighting device 2. In the arrangement illustrated, the power supply for the CPU 15 and the lighting device 2 comprises dc power sources 11 and 12. As illustrated, an electric power supply for the CPU 15 and the LCD display 3 (FIGS. 1-6) is provided by a first dc power source 11, and an electric power supply for the lighting device 2 is provided by a second dc power source 12 that is independent of the first dc power source. The first dc power source 11 may be either housed within the first housing 1 along with the second dc power source 12 or disposed at another appropriate location on the bicycle.

Figure 8:
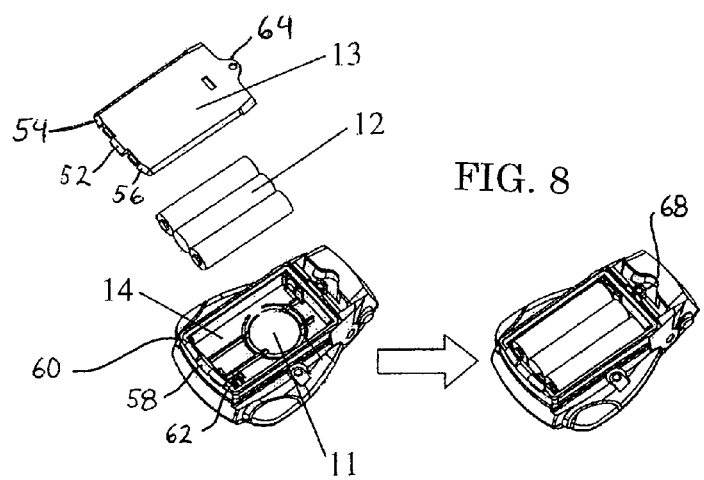
FIG. 8 shows the manner in which independent dc power sources are housed within a compartment of the cycle computer housing.

FIG. 8 shows the independent dc power sources 11 and 12 housed within a compartment 14 within the housing 1 for the cycle computer. If desired, the independent dc power sources 11 and 12 could be housed in multiple compartments. The compartment 14 is closable, by way of a lid 13, by inserting tabs 52, 54, and 56 of the lid 13 into receiving slots 58, 60, and 62 defined in the housing 1 of an associated cycle computer, and securing another tab 64 to the housing of the cycle computer with a screw 66 (FIG. 4) that is receivable within a threaded protrusion 68.

Structural and operational details of various components mentioned in the discussion of FIGS. 1-8 above will be apparent from the description that follows.

Figure 9:
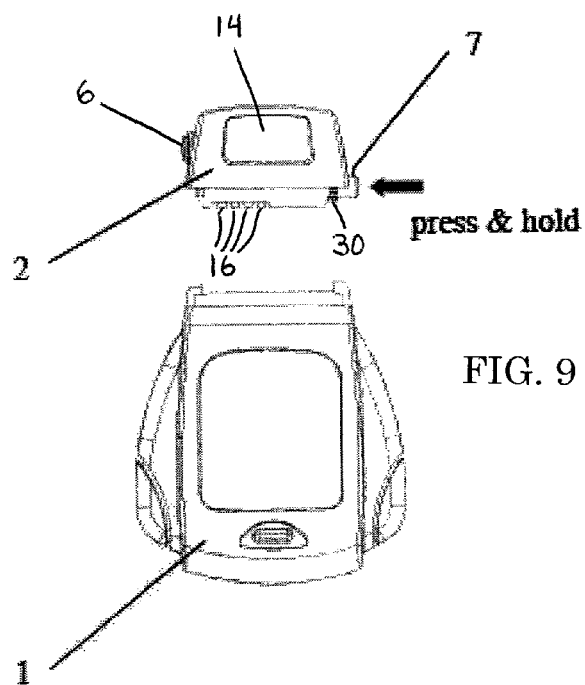
FIGS. 9-12 are views illustrating the manner in which the lighting device and the housing of an associated cycle computer can be interconnected.
Figure 13:
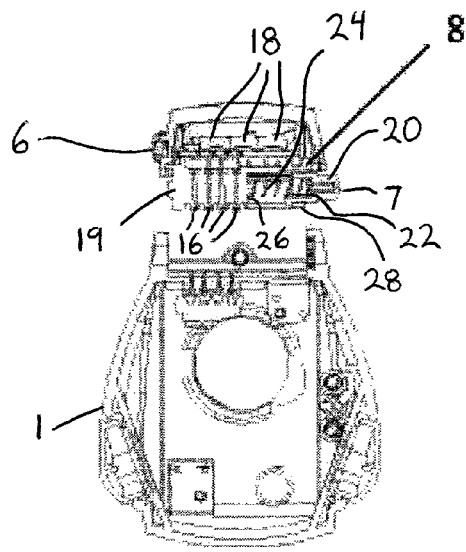
FIGS. 13-16 are views similar to those of FIGS. 9-12, respectively, but with portions of walls of the lighting device and cycle computer housing omitted.

A top view of the lighting device 2 and the housing of an associated cycle computer housing 1, prior to interconnection of the lighting device and the housing, is provided by FIG. 9. The lighting device 2 includes a lighting device housing 12 with a logo or other identifying indicia 14 mounted thereon, contacts 16 by which communication between LEDs 18 (FIGS. 2 and 13-16) and the appropriate dc power source 12 is enabled, the switch element 6 for controlling operation of the LEDs, and the pivot mechanism 7 for permitting adjustment and controlling the emission angle of light from the LEDs. Referring to the partially cut-away top view of the lighting device 2 and the cycle computer housing provided by FIG. 13, the pivot mechanism 7 is composed of a main part 19 and an actuator, which, as illustrated, is in the form of a push button 20, that can reciprocate within a hollow portion of the main pivot mechanism part 19. It is to be understood that the actuator could take any of a number of alternative forms, such as multiple push buttons, a sliding lock switch, and so on. The push button 20 includes a recess therein defining a wall or step 22, and the pivot mechanism additionally has a spring 24 received within the recess and biasing the push button 20 away from a spring seat 26 defined on the main pivot mechanism part 19 towards a stop 28 defined on the lighting device housing 12. Teeth or other protrusions 30 (FIG. 9) are defined on the circumferential outer surface of the push button 20.

Figure 10:
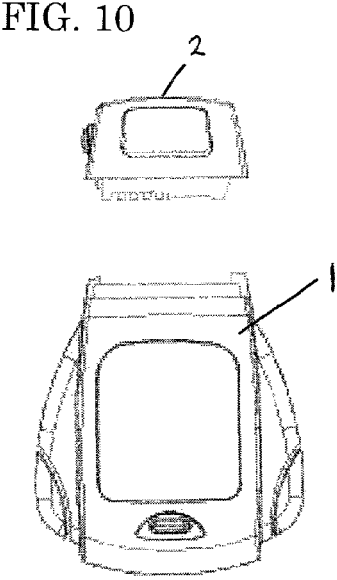
Figure 14:
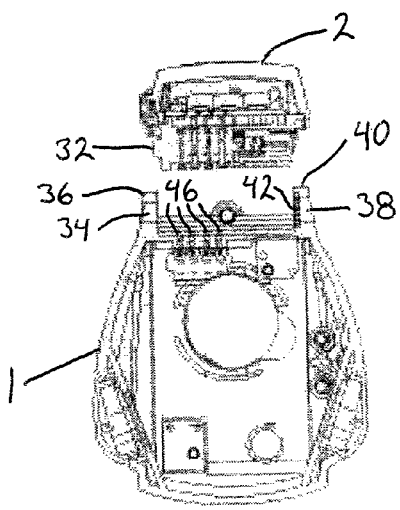

To attach the lighting device 2 to the cycle computer housing, initially, a user presses the push button 20 against the force applied by the spring 24 and towards the main pivot mechanism part 19, thereby resulting in the configuration shown in FIGS. 10 and 14. A projection 32, which is defined at an end of the main part 19 opposite to the spring seat 26, is inserted into an opening or bore 34 provided in a first flange 36 defining part of the mounting mechanism 8, resulting in the configuration shown in FIGS. 11 and 15. The lighting device 2 is subsequently pivoted around the location of projection 32 and opening 34 into the position shown in FIGS. 12 and 16, and the push button 20 is released, permitting the spring 24 to bias the push button outwardly, in the direction indicated in FIG. 12, into another opening or bore 38 provided in a second flange 40 of the mounting mechanism opposing the first flange 36. At this time, the teeth or other protrusions 30 defined on the circumferential outer surface of the push button 20 cooperate with corresponding recesses 42 defined around the circumference of the opening 38 to lock the overall lighting device 2 in position. To detach the lighting device 2 from the housing 1 of the cycle computer, of course, the acts or operations described are reversed.

Adjustment and control of the emission angle of light emitted by the lighting device 2 are performed by pressing the push button 20 against the force of the spring 24 to disengage the protrusions 30 from the recesses 42, rotating the lighting device 2 about an axis 44 relative to the housing 1 of the cycle computer, and releasing the push button 20 to again engage the protrusions 30 in the recesses 42 and lock the lighting device 2 in position.

Figure 11:
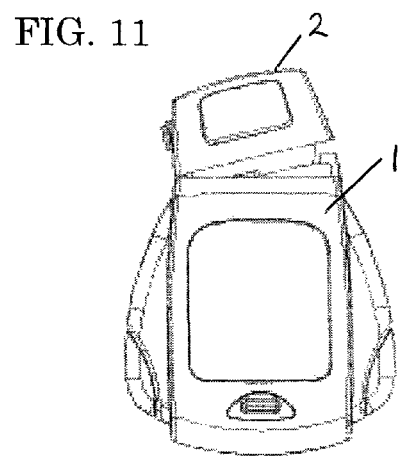
Figure 12:
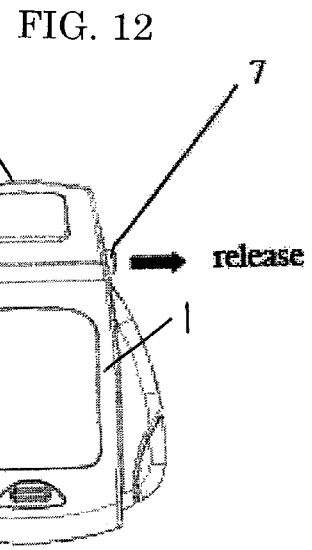
Figure 15:
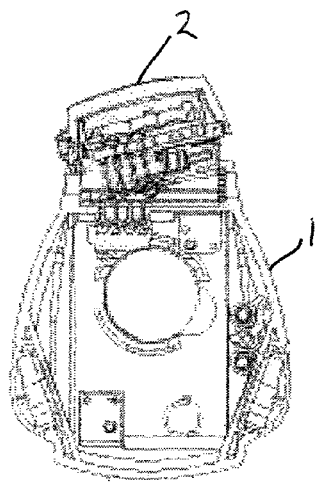
Figure 16:
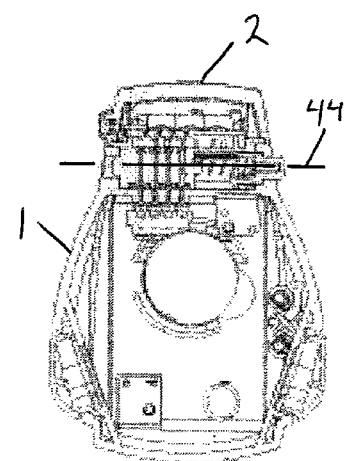

As the lighting device 2 is moved relative to the housing 1 of the cycle computer from the position shown in FIGS. 11 and 15 around the location of the projection 32 and the opening 34 into the position shown in FIGS. 12 and 16, the contacts 16 of the lighting device 2 are electrically interconnected with corresponding aligned contacts 46 in the associated cycle computer housing. In this way, upon appropriate actuation of the switch element 6, an electrical connection between the power source 12 and the LEDs 18 is permitted.

Figure 17:
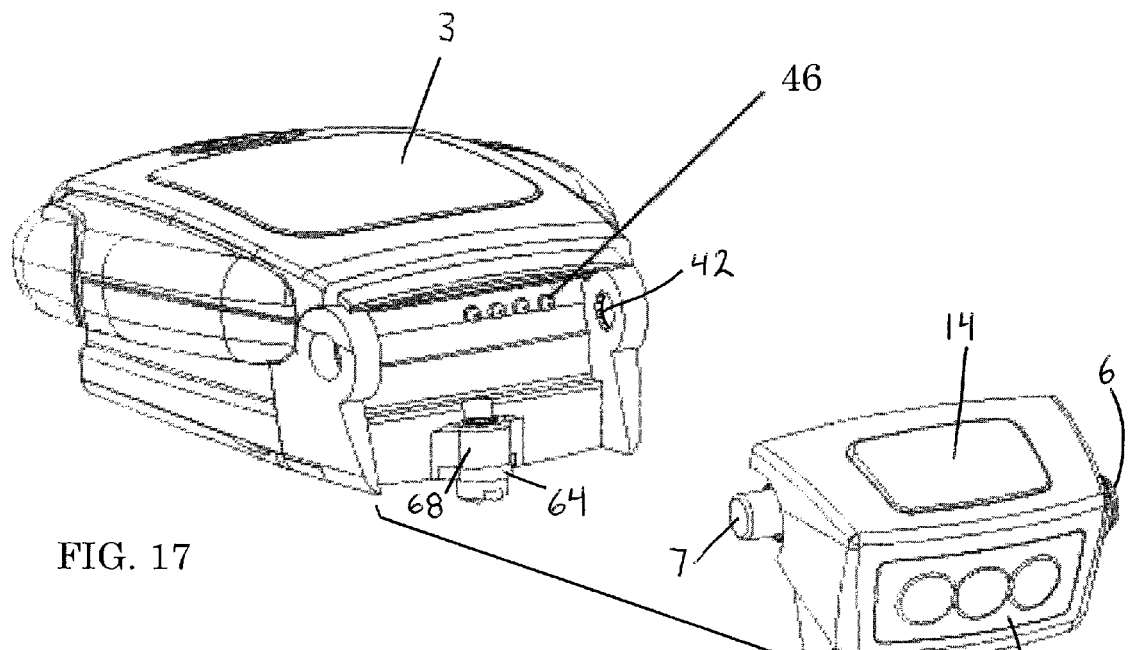
FIG. 17 is a view that more clearly illustrates the configuration of the contacts in the housing of the cycle computer.
Figure 18:
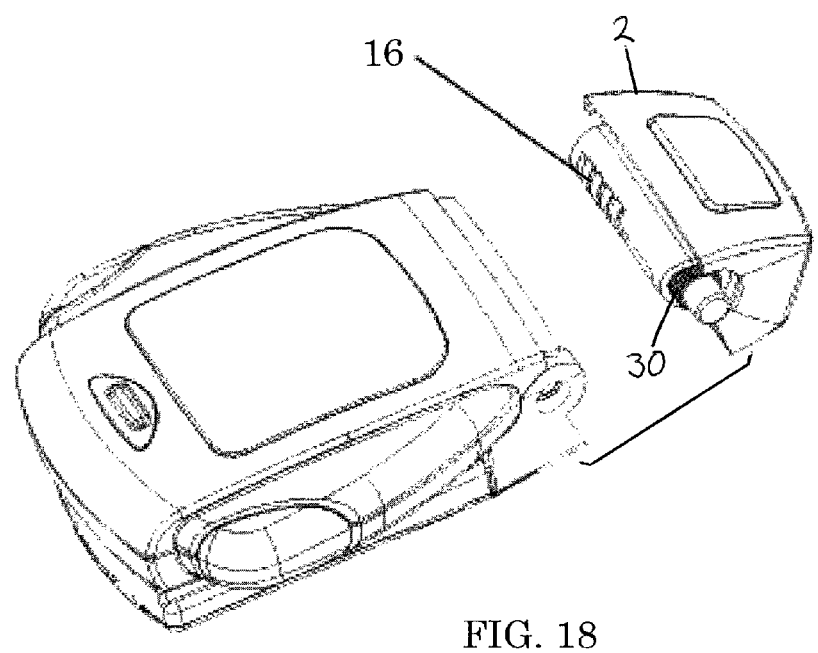
FIG. 18 is a view that more clearly illustrates the configuration of the lighting device contacts.

FIG. 17 more clearly illustrates the configuration of the contacts 46 in the housing 1 of the cycle computer, while FIG. 18 more clearly illustrates the configuration of the lighting device contacts 16.

Figure 19:
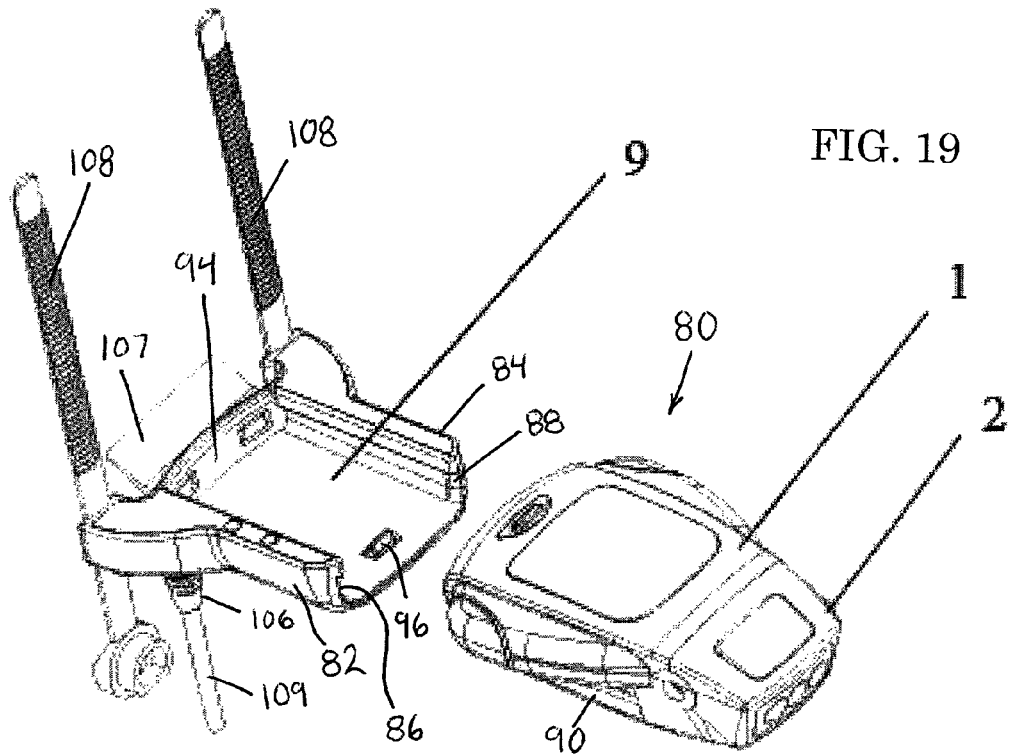
FIG. 19 is an enlarged view of certain elements shown in FIG. 5 showing the manner in which the combined assembly of the cycle computer housing and the lighting device is connected to the bicycle mount.
Figure 20:
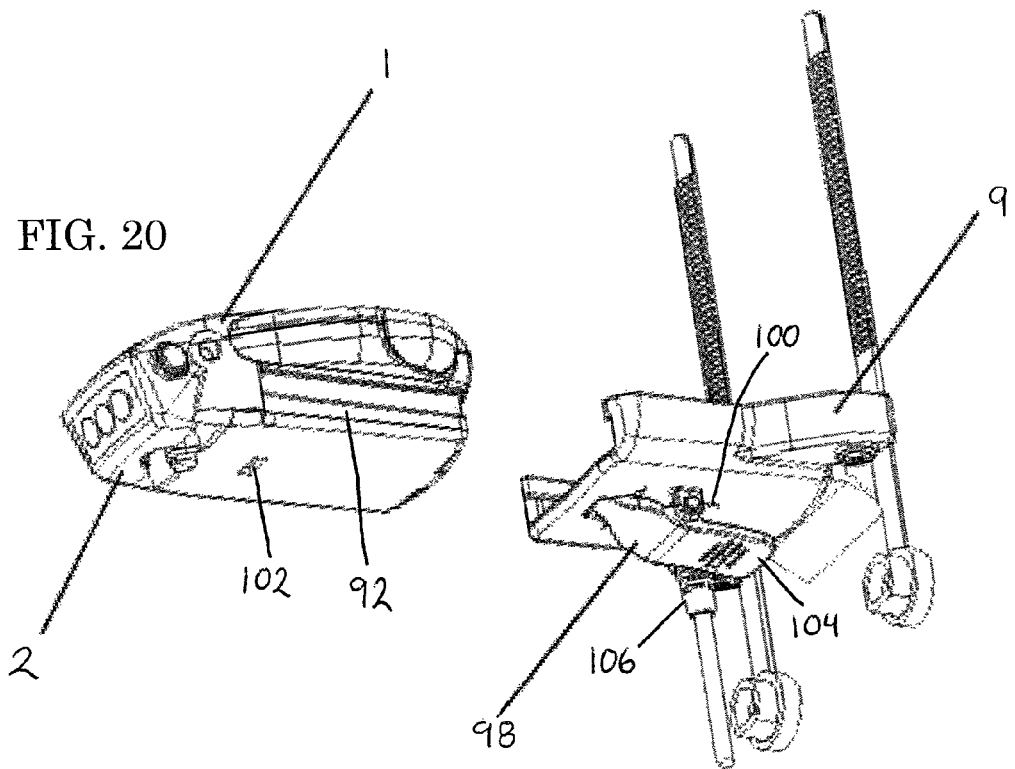
FIG. 20 is a view showing undersides of the elements illustrated in FIG. 19.

FIG. 19 is an enlarged view of certain elements shown in FIG. 5, and illustrates the manner in which the combined assembly 80 of the cycle computer housing 1 and the lighting device 2 is connected to the bicycle mount 9. The bicycle mount 9 has opposed lateral sides 82, 84 defining longitudinal grooves 86, 88 therein. Flanges 90, 92 defined on opposite lateral sides of the housing 1 of the cycle computer are receivable in the grooves 86, 88. The flanges 90, 92 are inserted into the grooves 86, 88, and the assembly 80 is displaced towards a front wall 94 of the mount 9 until it abuts the front wall and is locked into position by movement of a catch 96 at one end of a lever 98 (FIG. 20) pivoted on the underside of the bicycle mount 9. The lever 98 is biased by a force applied by a torsion spring 100 into a position in which the catch 96 enters a receptacle 102 defined on or in the underside of the bicycle mount 9. The catch 96 can be released from engagement in the receptacle 102 simply by depressing the end 104 of the lever 98 to permit separation of the assembly 80 from the bicycle mount 9.

The bicycle mount 9 can additionally include a jack 106 or other appropriate connection by which the cycle computer can be supplied with signals representative of measured data supplied from appropriate sensors over a cable 109 so that data based on those signals can be processed by the CPU 15 for output by the display 3. Guide flanges 107 can be used to facilitate alignment of the mount 9 with bicycle handlebars, and mounting straps 108 may also be provided to secure the mount 9 to handlebars of the bicycle. Each of the mounting straps would be configured essentially the same as the mounting strap 110 described in commonly assigned, co-pending U.S. patent application Ser. No. 12/032,189, filed Feb. 15, 2008, the disclosure of which is incorporated by reference above.

The foregoing disclosure has been set forth merely to illustrate the invention and is not intended to be limiting. Since modifications to the disclosed embodiments incorporating the spirit and substance of the invention may occur to persons of ordinary skill in the art, the invention should be construed to include everything within the scope of the appended claims and equivalents thereof.

We claim:

1. A lighting apparatus useable with a bicycle or other manually operated vehicle comprising:
   a first housing within which a central processing unit and at least one power source are receivable,
   a second housing, including a light emitting element, that is adjustable to multiple angular positions relative to the first housing to provide illumination at different emission angles, and
   a pivot mechanism, by which the first and second housings are attachable to and detachable from each other, that allows relative pivotal movement between the first and second housings and permits electrical communication between the light emitting element and the power source when the first and second housings are attached to each other, the pivot mechanism including a main part with a plurality of contacts permitting said electrical communication, an actuator axially reciprocable relative to the main part to alternately permit detachment of the housings from each other and locking of the housings together with the second housing in one of said angular positions, and a spring biasing the actuator away from the main part.

2. The lighting apparatus according to claim 1, wherein said pivot mechanism is carried by the second housing so as to be detachable from the first housing along with the second housing.

3. The lighting apparatus according to claim 2, wherein said second housing is one of a plurality of second housings that are interchangeable to provide for varied lighting conditions.

4. The lighting apparatus according to claim 1, wherein said actuator is also operable to lock the second housing in any of said multiple angular positions relative to the first housing.

5. The lighting apparatus according to claim 4, wherein said second housing is one of a plurality of second housings that are interchangeable to provide for varied lighting conditions.

6. The lighting apparatus according to claim 1, wherein said second housing is one of a plurality of second housings that are interchangeable to provide for varied lighting conditions.

7. The lighting apparatus according to claim 1, wherein said power source is one of a pair of direct current power sources receivable within said first housing.

8. The lighting apparatus according to claim 7, wherein said second housing is one of a plurality of second housings that are interchangeable to provide for varied lighting conditions.

9. The lighting apparatus according to claim 1, wherein the first housing includes multiple contacts engageable with the contacts of said main part of said pivot mechanism to provide said electrical communication.

10. The lighting apparatus according to claim 9, wherein said second housing is one of a plurality of second housings that are interchangeable to provide for varied lighting conditions.

11. A lighting apparatus useable with a bicycle or other manually operated vehicle comprising:
first housing means for receiving a central processing unit and at least one power source,
second housing means, adjustable to multiple angular positions relative to the first housing and including a light emitting element, for providing illumination at different emission angles, and
a pivot mechanism, by which the first and second housing means are attachable to and detachable from each other, for allowing relative pivotal movement between the first and second housing means and permitting electrical communication between the light emitting element and the power source when the first and second housing means are attached to each other, the pivot mechanism including a main part with a plurality of contacts permitting said electrical communication, an actuator axially reciprocable relative to the main part to alternately permit detachment of the housing means from each other and locking of the housing means together with the second housing means in one of said angular positions, and a spring biasing the actuator away from the main part.

12. The lighting apparatus according to claim 11, wherein said pivot mechanism is carried by the second housing means so as to be detachable from the first housing means along with the second housing means.

13. The lighting apparatus according to claim 12, wherein said second housing means is one of a plurality of interchangeable elements providing for varied lighting conditions.

14. The lighting apparatus according to claim 11, wherein said actuator is also operable to lock the second housing means in any of said multiple angular positions relative to the first housing means.

15. The lighting apparatus according to claim 14, wherein said second housing means is one of a plurality of interchangeable elements providing for varied lighting conditions.

16. The lighting apparatus according to claim 11, wherein said second housing means is one of a plurality of interchangeable elements providing for varied lighting conditions.

17. The lighting apparatus according to claim 11, wherein said power source is one of a pair of direct current power sources receivable within said first housing means.

18. The lighting apparatus according to claim 17, wherein said second housing means is one of a plurality of interchangeable elements providing for varied lighting conditions.

19. The lighting apparatus according to claim 11, wherein the first housing means includes multiple contacts engageable with the contacts of said main part of said pivot mechanism to provide said electrical communication.

20. The lighting apparatus according to claim 19, wherein said second housing means is one of a plurality of interchangeable elements providing for varied lighting conditions.

* * * * *